United States Patent
Matsuda et al.

(10) Patent No.: US 7,178,433 B2
(45) Date of Patent: Feb. 20, 2007

(54) PROCESSING APPARATUS, PROCESSING METHOD AND DIAMOND TOOL

(75) Inventors: Hiroyuki Matsuda, Sagamihara (JP); Shigeru Hosoe, Hachioji (JP); Kazuhiro Wada, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 499 days.

(21) Appl. No.: 10/806,175

(22) Filed: Mar. 23, 2004

(65) Prior Publication Data

US 2004/0217496 A1    Nov. 4, 2004

(30) Foreign Application Priority Data

Mar. 27, 2003   (JP)   ............................. 2003-087953
Aug. 27, 2003   (JP)   ............................. 2003-302274

(51) Int. Cl.
  *B23B 3/00*   (2006.01)
  *B23P 15/28*  (2006.01)

(52) U.S. Cl. ........................................ 82/1.11; 407/113

(58) Field of Classification Search ................. 82/1.11, 82/158, 159; 409/199, 132, 142, 143, 174; 407/113, 114, 54, 65
See application file for complete search history.

(56) References Cited

U.S. PATENT DOCUMENTS

| | | | | |
|---|---|---|---|---|
| 4,400,118 A | * | 8/1983 | Yamakage et al. | 408/3 |
| 4,451,892 A | * | 5/1984 | McMurtry | 700/192 |
| 4,513,646 A | * | 4/1985 | McMurtry | 82/1.11 |
| 4,637,169 A | * | 1/1987 | Sigg | 451/11 |
| 4,653,360 A | * | 3/1987 | Compton | 82/18 |
| 4,778,233 A | * | 10/1988 | Christenson et al. | 359/214 |
| 5,067,284 A | * | 11/1991 | Putnam et al. | 451/28 |
| 5,125,775 A | * | 6/1992 | Breuer et al. | 409/132 |
| 5,802,937 A | * | 9/1998 | Day et al. | 82/1.11 |
| 6,637,303 B2 | * | 10/2003 | Moriwaki et al. | 82/1.4 |
| 6,846,137 B1 | * | 1/2005 | Border et al. | 409/163 |
| 6,908,266 B1 | * | 6/2005 | Border et al. | 409/226 |

* cited by examiner

*Primary Examiner*—Willmon Fridie, Jr.
(74) *Attorney, Agent, or Firm*—Finnegan, Henderson, Farabow, Garrett & Dunner, L.L.P.

(57) ABSTRACT

A processing apparatus is provided with a diamond tool. When a first edge portion is made as X axis, a tip end peak point of a rake face is made as an intercept (0, y) on Y axis, and the rake face is projected in the first quadrant on an X-Y plane, a shape between an end portion of a first edge portion and an end portion of a second edge portion is asymmetric around a straight line which passes at the intercept and is parallel to X axis and the shape is shaped to be not a straight line such that Y value of a point on the shape increases as X value of the point increases.

45 Claims, 9 Drawing Sheets

FORM OF PROCESSING BY CONVENTIONAL R-CUTTING TOOL

FORM OF PROCESSING BY DIAMOND CUTTING TOOL OF THE INVENTION

PROCESSING APPARATUS, PROCESSING METHOD AND DIAMOND TOOL

BACKGROUND OF THE INVENTION

The present invention relates to a processing apparatus, a processing method and a diamond tool, and in particular, to a processing apparatus, a processing method and a diamond tool which are suitable for processing a forming die for forming optical elements.

For processing an optical transfer surface of a forming die for forming high precision optical elements such as an objective lens of an optical pickup device, for example, there has been used an R-cutting tool made of mono-crystal diamond which has a nose radius of a face angle of about 0.1–1.5 mm and has a face angle of about 40–60°. When an optical transfer surface form is composed of a single surface expressed by a general aspheric surface equation, for example, there has been used a superfine processing machine, which has made it possible to obtain high precision optical transfer surface through only cutting operations. On the other hand, when conducting generating processing for the optical transfer surface having a structure of more fine forms, there is used an R-cutting tool having more fine nose radius, as is described in Patent Document 1.

(Patent Document 1)
 TOKKAI No. 2003-62707

By using an R-cutting tool having a fine nose radius described in the Patent Document 1, it has become possible to generate an optical transfer surface which is more precise. In the field of optical pickup devices in recent years, however, there is a demand for conducting recording and/or reproducing of high density information by using a violet laser, and there is a requirement to bring the optical transfer surface form close to the ideal state to improve optical characteristics of optical elements used for optical pickup devices, responding to the demand mentioned above. However, there is a limit for the R-cutting tool stated above to generate precision optical transfer surface, because of the structure of the R-cutting tool. The reason for the foregoing will be explained as follows.

FIG. 1 is a sectional view of a forming die for forming an optical element, the forming die being cut by the use of a conventional R-cutting tool, and in this case, it is assumed that ring-shaped grooves for forming a ring-shaped zonal lens represented by a diffractive lens are generated on the optical transfer surface through cutting. R-cutting tool 3 has a cutting face that is composed of straight-line-shaped first edge portion 3a, straight-line-shaped second edge portion 3b and circular-arc-shaped third edge portion 3c.

Die material 1 representing an article to be processed is cylindrical and is driven to rotate on rotation axis (optical axis of an optical element formed by a forming die (which is also called an optical axis of a forming die) 2. It is assumed that base optical transfer surface 1a is formed on die material 1 in advance corresponding to the optical aspheric surface. Under this condition, diamond tool 3 is given feeding in the optical axis direction (Z-axis direction) corresponding to a ring-shaped zonal shape, and is given feeding in the radial direction (X-axis direction) towards a center portion from an outer circumference side of metal mold material 1, thus, die material 1 is subjected to cutting operations. As a result, the metal mold material 1 is cut by diamond tool 3, and cylindrical surface 1b, ring-shaped optical transfer surface 1c and R curved surface 1d that connects the cylindrical surface 1b and ring-shaped optical transfer surface 1c are formed.

However, since an optical element in design is to be formed by a forming die wherein cylindrical surface 1b and ring-shaped optical transfer surface 1c are directly connected, if a forming die generated by the conventional processing method is used, there is a fear that design values are not satisfied by optical characteristics of the optical element. To be more concrete, R curved surface 1d which connects the cylindrical surface 1b to the ring-shaped optical transfer surface 1c is formed when a nose form of R-cutting tool 3 is transferred, and therefore, a form of a corner portion of a diffractive groove is different from a form in design, thereby, an optical path difference of diffracted light which should be generated originally fails to be generated. Therefore, there is a problem that diffraction efficiency of the optical element is lowered.

Further, on the optical element onto which R curved surface 1d that connects the cylindrical surface 1b to the ring-shaped optical transfer surface 1c is transferred and formed, a light flux which has entered a portion corresponding to the R curved surface 1d scatters without emerging as designed, which results in a decline of transmission factor of the optical element. To avoid the problem of this kind, there is an idea to sharpen a tip of the R-cutting tool (for example, cone-point cutting tool), which, however, causes another problem that a tip of the R-cutting tool tends to be broken by a stress in the course of processing, and surface roughness of the ring-shaped optical transfer surface 1c is worsened.

SUMMARY

The invention has been achieved in view of the problems stated above, and its aspect is to provide a processing apparatus, a processing method and a diamond tool which are suitable for processing of a forming die for forming an optical element represented, for example, by a diffractive lens, and are capable of processing a corner portion of a diffractive groove to be sharp while keeping the surface roughness of a ring-shaped optical transfer surface to be satisfactory, to form a high precision processing surface.

The above aspect can be achieved by the processing apparatus described in Item 1.

That is, the processing apparatus described in Item 1 has therein a diamond tool in which a cutting face (rake face) having, on its cutting edge made of diamond, a linear first edge portion, a second edge portion in an optional form and a quadratic-curve-shaped third edge portion that is formed between an end portion of the first edge portion and an end portion of the second edge portion, and is continued to the end portion of the second edge portion, is provided, and the peak of the tip of the cutting face is positioned at the third edge portion, a clamping member that clamps the diamond tool and a moving means that moves the total cutting face of the diamond tool and a portion to be processed of an article to be processed relatively in the direction crossing the cutting face, wherein when the cutting face is projected within the first quadrant on an X-Y plane with the first edge portion representing an X axis and with the peak of the tip of the cutting face representing an intercept (0, y), a shape formed between the end portion of the first edge portion and the end portion of the second edge portion, is asymmetric linearly for a straight line that is in parallel with the X axis passing through the intercept, and a shape of the third edge portion covering from the peak of the tip of the cutting face to the end portion of the second edge portion is in a shape of a curve wherein Y increases when X increases. In the above structure, the curve is preferable to be a quadratic curve.

Herein, in this description, "the total cutting face" means all points on the cutting face. Further, "moving relatively" includes, for example, an occasion to move only the portion to be processed, an occasion to move only the diamond tool and an occasion to move both of them. Further, though it is preferable that the third edge portion and the first edge portion cross each other (connected directly so that a prescribed angle may be formed), a form of an edge portion that is located within a distance of 0.4 μm or less in the direction perpendicular to the direction that is in parallel with the first edge portion from a point of intersection of the extended third edge portion and the extended first edge portion, may be in any forms. When a form of an edge portion is indeterminate in terms of form, it is more preferable that a form of an edge portion is in a range of 0.2 μm or less. Further, it may be preferable that the edge portion of the indeterminate portion is not protruded from the tip end peak point of the cutting face. When such indeterminate edge portion exists, "an end portion of the first edge portion on the side of the third edge portion" is made to be an end portion of the first edge portion connected to the indeterminate edge portion that connects both of them, and "an end portion of the third edge portion on the side of the first edge portion" is made to be an end portion of the third edge portion connected to the indeterminate edge portion that connects both of them. In this specification, "tip end peak point" means a point closest to Y axis when the cutting face is projected within the first quadrant on an X-Y plane so as to place the straight line-shaped first edge portion on X axis. At this time, when a perpendicular line is drawn to X axis, it may be preferable that the tip end peak point of the cutting face has a length within a range 0 to 0.4 μm. More preferably, the length is within a range 0.01 μm to 0.3 μm. Further, a linear form or a circular-arc-shaped form is judged depending on whether the correlation rate is not less than 70% or not, when edge portions of the cutting face are extracted as sample points at an interval of 0.1 μm to be subjected to regression approximation. Further, "a non linear shape" means a form whose correlation rate is less than 70% when edge portions of the cutting face are extracted as sample points at an interval of 0.1 μm and the shape is subjected to regression approximation. Further, when judged to be "a non linear shape", "a linear shape", "a circular arc shape" or "a quadratic curve shape", one straight line, a circular arc or a quadratic curve each being most appropriate as a virtual line is drawn, the starting point that is outside the virtual line is assumed to be "an end portion of the edge portion". In addition, "an optional form" means that it may be any of a straight line form, a curved line form such as a quadratic curve form and a circular arc form and a form of combination of the foregoing.

DETAILED DESCRIPTION OF THE PREFERRED EMBODIMENT

Hereinafter, the preferred embodiment of the present invention will be explained with reference of drawings.

Figure 11:
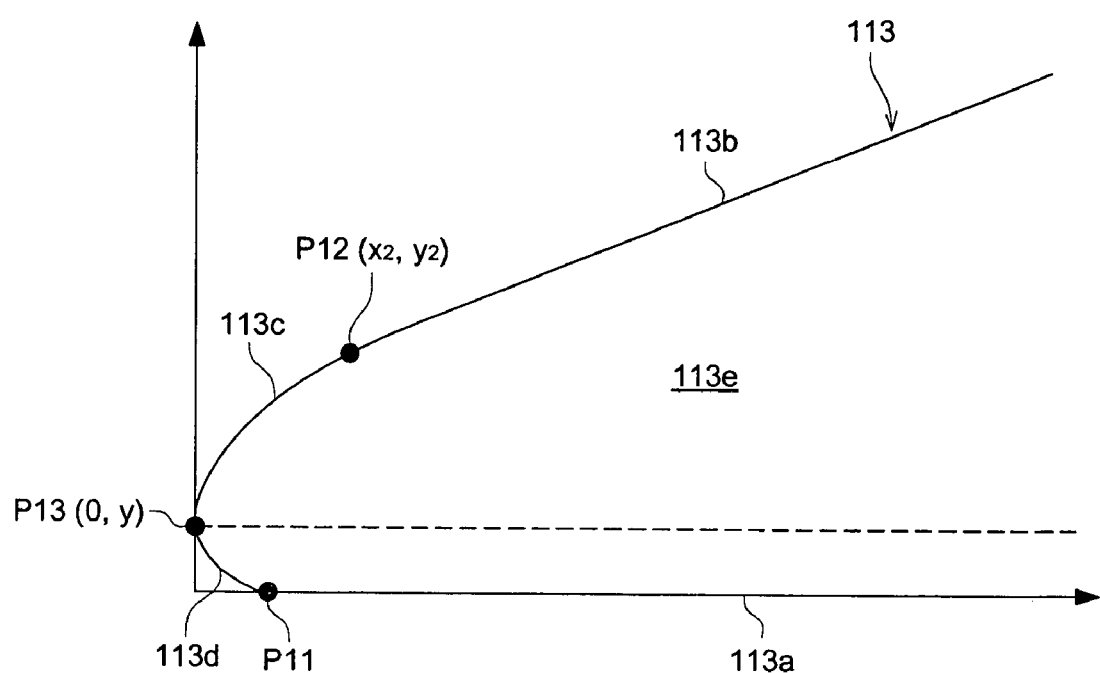
FIG. 11 is a view showing a contour of a cutting face of a diamond tool relating to the invention which is projected on the first quadrant of xy coordinates.

With respect to a preferable structure of the invention, its specific example will be explained as follows, referring to FIG. 11. FIG. 11 is a diagram showing a contour of a cutting face of a diamond tool relating to the invention which is projected on the first quadrant of xy coordinates. The contour of cutting face 113e of diamond tool 113 in FIG. 11 is composed of first edge portion 113a in a straight line form, second edge portion 113b in an optional form, third edge portion 113c in a quadratic curve form continued to end portion P 12 of the second edge portion 113b formed between end portion P 11 of the first edge portion 113a and end portion P 12 of the second edge portion 113b and of fourth edge portion 113d formed between end portion P 11 of the first edge portion 113a and end portion P 13 of the third edge portion 113c.

In FIG. 11, when cutting face 113e is projected within the first quadrant on an X-Y plane with the first edge portion 113a representing an X axis and with the peak of the tip of the cutting face 113e (end portion P 13 in this case) representing an intercept (0, y) of Y axis, a shape formed between the end portion P 11 of the first edge portion 113a and the end portion P 12 of the second edge portion 113b, is asymmetric linearly for a straight line (shown with dotted lines) that is in parallel with the X axis passing through the intercept P 13, and a shape of the third edge portion 113c covering from the peak of the tip of the cutting face 113e to the end portion P 12 of the second edge portion 113c is in a shape of the quadratic curve wherein Y increases when X increases.

Though an example of a shape wherein fourth edge portion 113d is formed between end portion P 11 of the first edge portion 113a and end portion P 13 of the third edge portion 113c is shown in FIG. 11, it is also possible to employ a shape wherein the fourth edge portion 113d is not present, and end portion P 13 of the third edge portion is continued to end portion P 11 of the first edge portion. It is preferable that Y of intercept (0, y) of Y axis in the case that fourth edge portion 113d is formed is 0.4 μm or less as a distance, and providing the fourth edge portion is preferable because a fear of damage can be reduced while securing highly accurate cutting processing, even under the severe environment for use.

The processing apparatus described in Item 2 is represented by the invention described in Item 1, wherein when the aforementioned cutting face is projected within the first quadrant on an X-Y plane with the first edge portion representing an X axis and with the peak of the tip of the cutting face representing an intercept (0, y) of Y axis, $2y<y_2$ is satisfied when $(x_2, y_2)$ represents coordinates of an end portion of the second edge portion.

The processing apparatus described in Item 3 is represented by the invention described in Item 1 or Item 2, wherein Y in the intercept (0, y) is within a range of 0 μm–0.4 μm as a distance.

The processing apparatus described in Item 4 is represented by the invention described in either one of Items 1–3, wherein there is provided fourth edge portion in an optional form by which an end portion of the third edge portion is continued to the end portion of the first edge portion.

The processing apparatus described in Item 5 is represented by the invention described in Item 4, wherein an end portion of the third edge portion is a peak of a tip of the cutting face.

The processing apparatus described in Item 6 is represented by the invention described in either one of Items 1–3, wherein an end portion of the third edge portion is continued to the end portion of the first edge portion, which represents, for example, an occasion of y=0.

The processing apparatus described in Item 7 is represented by the invention described in Item 6, wherein the peak of the tip of the cutting face agrees in terms of position with the end portion of the first edge portion, which represents, for example, an occasion of y=0.

The processing apparatus described in Item 8 is represented by the invention described in either one of Items 1–7, wherein the third edge portion is convex.

The processing apparatus described in Item 9 is represented by the invention described in either one of Items 1–8, wherein the quadratic curve is in a form of a convex circular arc. In this case, "convex" means, for example, a shape swelling outward from cutting face 113e as shown in FIG. 11.

The processing apparatus described in Item 10 is represented by the invention described in Item 4 or Item 5, wherein the third edge portion and the fourth edge portion are convex.

The processing apparatus described in Item 11 is represented by the invention described in Item 10, wherein each of the third edge portion and the fourth edge portion is in a form of a convex circular arc.

A processing apparatus described in Item 12 has therein a diamond tool equipped with a cutting face having, on its cutting edge made of diamond, a linear first edge portion, a second edge portion extending in the direction crossing the first edge portion and a circular-arc-shaped third edge portion formed between an end portion of the first edge portion and an end portion of the second edge portion, a clamping member that clamps the diamond tool and a moving means that moves the total cutting face of the diamond tool and a portion to be processed of an article to be processed relatively in the direction crossing the cutting face, wherein the third edge portion is in a form that is asymmetric linearly for a bisector of an angle formed by a first tangential line on an end portion of the first edge portion on the side of the third edge portion and a second tangential line on an end portion of the second edge portion on the side of the third edge portion.

Figure 2:
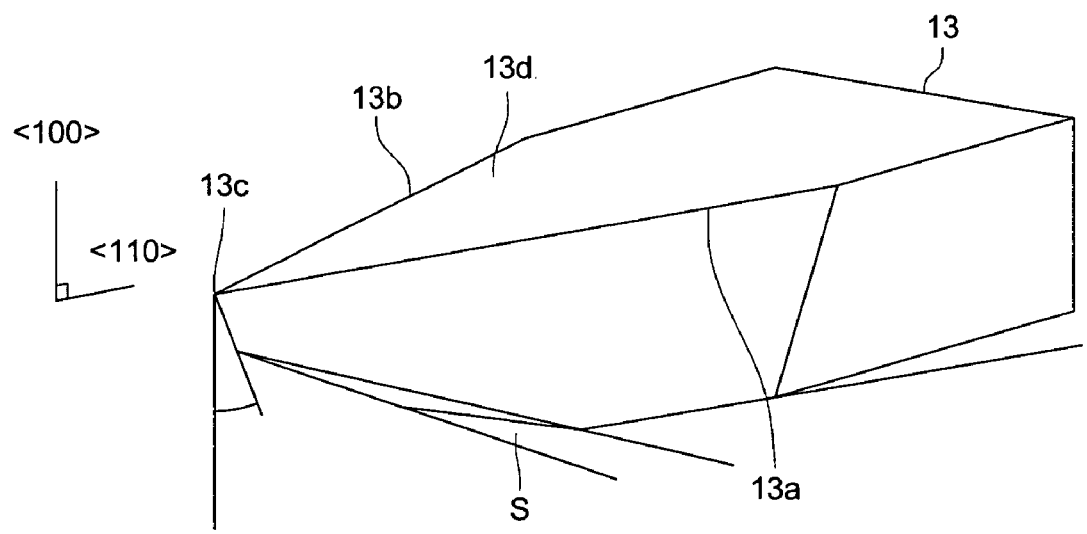
FIG. 2 is a perspective view of a diamond tool relating to the invention.

Concrete examples about the structure of the invention will be explained as follows, referring to FIGS. 2 and 3. FIG. 2 is a perspective view of a diamond tool relating to the invention. Cutting edge 13 of the diamond tool is brazed on shank S showing a part thereof and has cutting face 13d that faces the direction of rotation of the die to be cut. The tip portion of the cutting face 13d has thereon edge portion 13a representing a first edge portion, edge portion 13b representing a second edge portion and third edge portion 13c that connects edge portion 13a to edge portion 13b.

Figure 1:
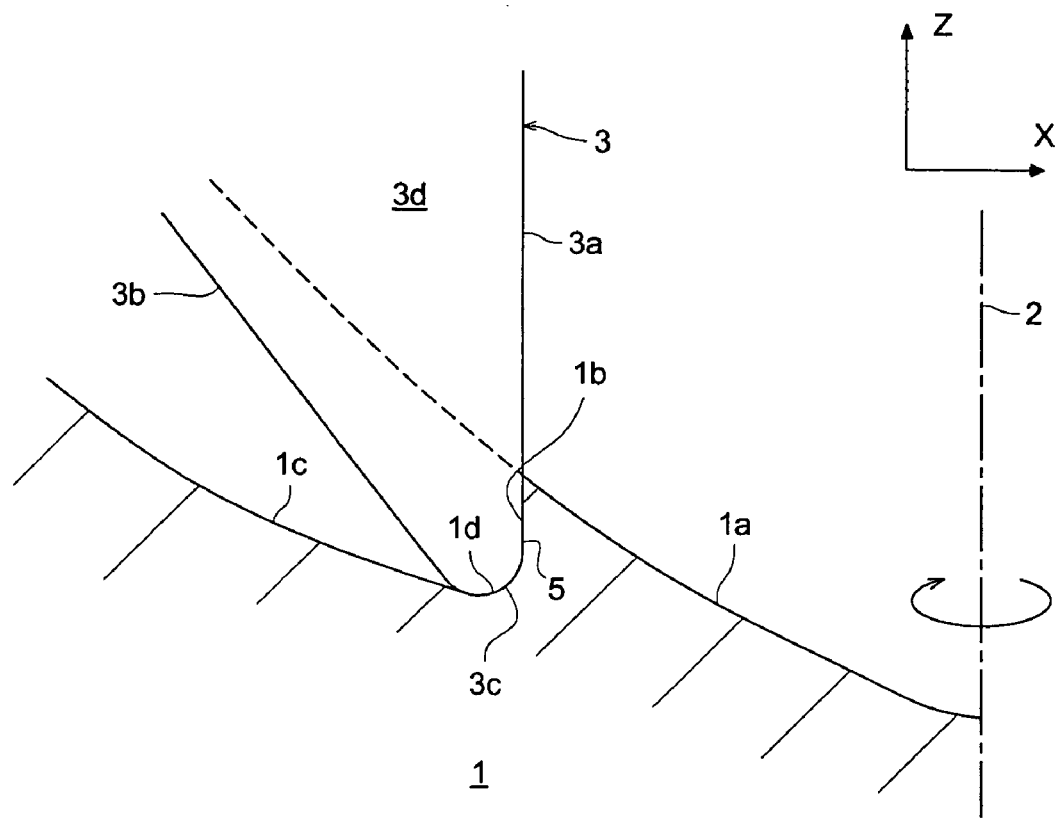
FIG. 1 is a sectional view wherein a forming die for forming optical elements which is cut by the use of a conventional R-cutting tool is shown together with the R-cutting tool.

FIG. 13 is a sectional view of a forming die for forming optical elements, the forming die being cut by the use of a diamond tool relating to the invention, and ring-shaped zonal grooves for forming ring-shaped zonal lens represented by a diffracting lens are generated on its optical transfer surface through cutting in the same way as in FIG. 1. In the diamond tool 13 in FIG. 3, the first edge portion 13a is in a form of a straight line, the second edge portion 13b is in a form of a circular arc or a straight line, and circular-arc-shaped third edge portion 13c and the first edge portion 13a are connected to cross each other or connected with microscopic circular-arc-shaped edge portion.

Figure 3:
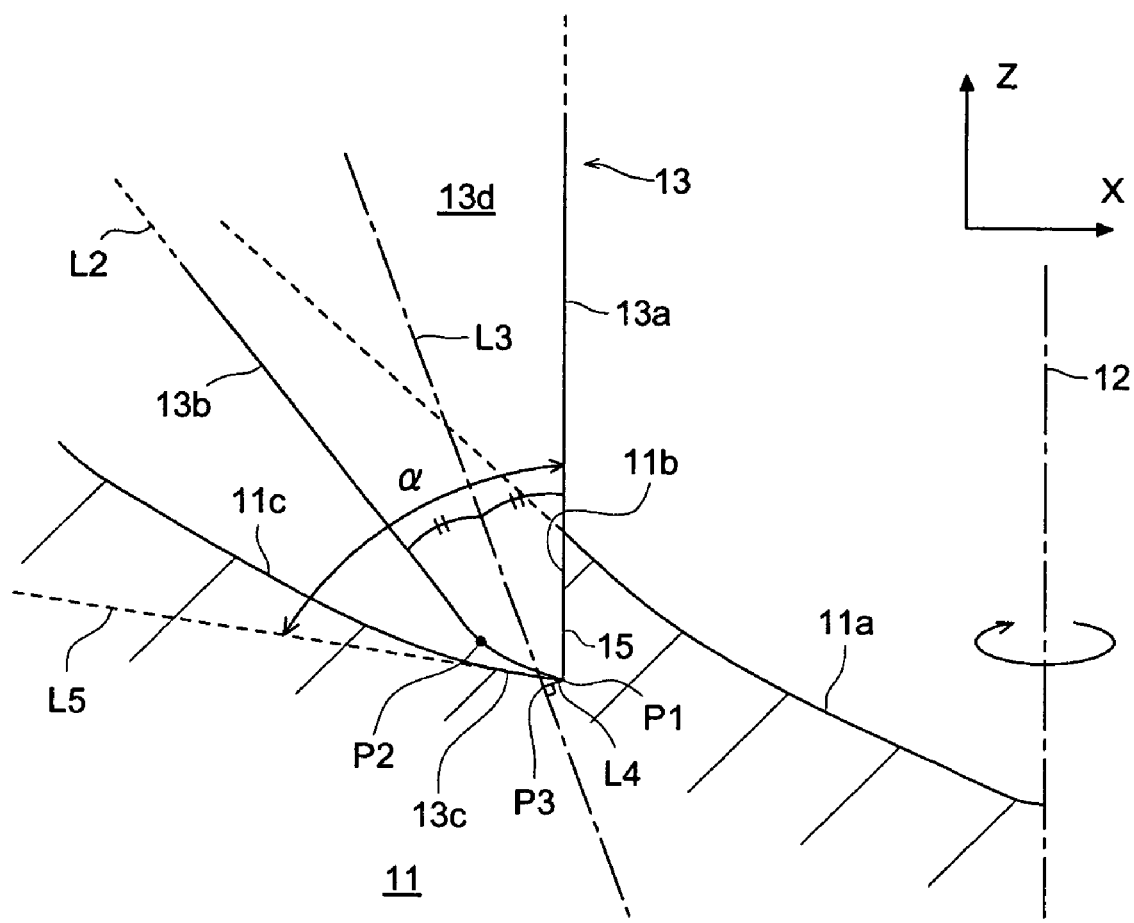
FIG. 3 is a sectional view wherein a forming die for forming optical elements which is cut by the use of a diamond tool of the invention is shown together with the diamond tool.

Further, in FIG. 3, the third edge portion 13c is in a form that is asymmetric linearly for bisector L3 of an angle formed by first tangential line L1 on an end portion P1 of the first edge portion 13a (overlapping with the first edge portion 13a) and by second tangential line L2 on end portion P2 of the second edge portion 13b (overlapping substantially with the second edge portion 13b). Owing to the aforementioned structure, the diamond tool 13 has the following functional effects.

Die material 11 representing an article to be processed is cylindrical and is driven to rotate on rotation axis (corresponding to an optical axis of an optical element formed by a forming die) 12. It is assumed that base optical transfer surface 11a is formed on the die material 11 in advance corresponding to the optical aspheric surface. Under this condition, diamond tool 13 is given feeding in the optical axis direction (Z-axis direction) corresponding to a ring-shaped zonal shape, and is given feeding in the radial direction (X-axis direction) towards a center portion from an outer circumference side of die material 11, thus, die material 11 is subjected to cutting operations. As a result, the die material 11 is cut by the diamond tool 13, and cylindrical surface 11b and ring-shaped optical transfer surface 11c are formed.

When die material 1 is cut by diamond tool 13 shown in FIG. 3, R-curved surface 11d shown in FIG. 1 is not formed, or an extremely small R-curved surface (corresponding to microscopic circular-arc-shaped edge portion) is formed, which is clear if FIG. 1 is compared with FIG. 3. Therefore, it is possible to further improve optical characteristics of optical elements formed by the forming die having the optical transfer surface that is generated by the use of diamond tool 13. In this case, it is also possible to use a cone-point tool wherein a cutting edge of the diamond tool is in a shape of a flat plate having a width of about 0.5 μm for processing so that R-curved surface 1d shown in FIG. 1 may not be formed. In this case, there is a problem that a tool tends to be damaged and surface roughness on the ring-shaped optical transfer surface portion is deteriorated. For this problem, if the tool of the invention is used, the same surface roughness as that in the case of processing with R-cutting tool can be obtained because a portion of ring-shaped optical transfer surface 11c is processed by circular-arc-shaped third edge portion 13c, and the tool turns out to be hardly damaged because a sectional area of a cutting edge grows greater compared with a cone-point cutting tool.

Figure 9:
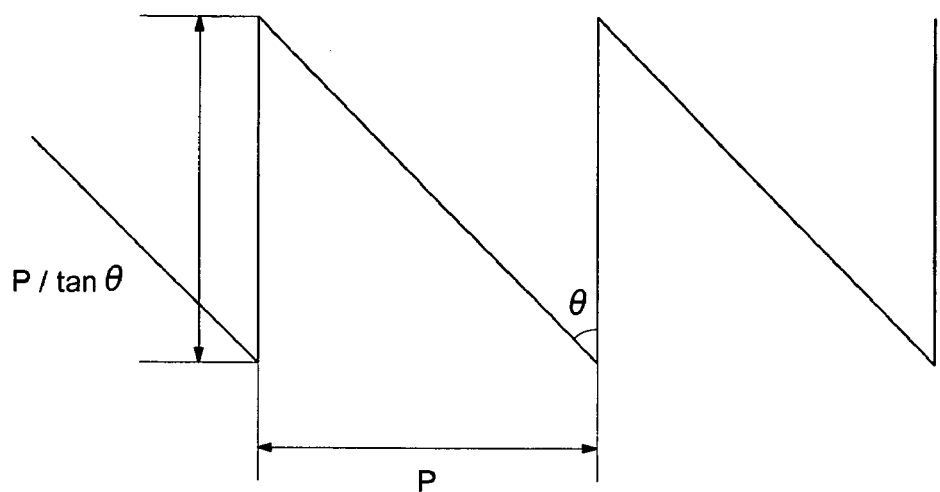
FIG. 9 is a sectional view of a processed surface of a ring-shaped optical transfer surface in the case of processing by a cone-point tool.
Figure 10:
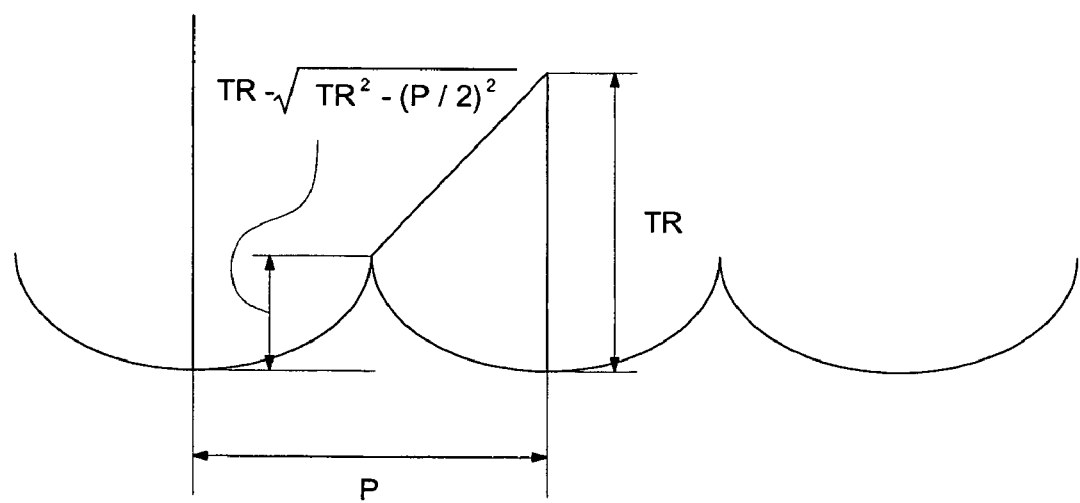
FIG. 10 is a sectional view of a processed surface of a ring-shaped optical transfer surface in the case of processing by the tool of the invention.

More specific examples are shown in FIGS. 9 and 10. FIG. 9 shows a processed surface of ring-shaped optical transfer surface 1c in the case of processing with a tool of cone-point cutting tool, and FIG. 10 shows a processed surface of ring-shaped optical transfer surface 1c in the case of processing with the tool of the invention. When the feeding pitch for the tool is made to be P for both occasions, an amount of roughness on the processed surface is P/tan θ for the cone-point cutting tool, and is $TR-\sqrt{(TR^2-(P/2)^2)}$ for the tool of the invention. The symbol θ represents a face angle of the cone-point tool and TR represents a radius of a circular arc of the third edge portion. Under the assumption of P=1 μm, θ=30° and TR=1.5 μm, an amount of unevenness is 1.7 μm for the cone-point tool and is 0.085 μm for the tool of the invention, which means that an excellent surface roughness can be obtained. In other words, by using the tool of the invention, it is possible to process a corner of a diffractive groove to be sharp while keeping the surface roughness of a ring-shaped optical transfer surface to be in an excellent condition, which has been impossible in the past.

The processing apparatus described in Item 13 is one according to the Item 12, wherein when a perpendicular line is drawn on the aforementioned bisector from an end portion of the third edge portion on the side of the first edge portion, the point of intersection of the perpendicular line and the bisector is positioned outside the cutting face. In FIG. 3, when perpendicular line L4 is drawn on bisector L3 from end portion P1 of the first edge portion 13a, point of intersection P3 of the perpendicular line L4 and the bisector L3 is positioned outside the cutting face 13d.

A processing apparatus described in Item 14 has therein a diamond tool equipped with a cutting face having, on its cutting edge made of diamond, a linear first edge portion, a second edge portion extending in the direction crossing the first edge portion and a circular-arc-shaped third edge portion formed between an end portion of the first edge portion and an end portion of the second edge portion, a clamping member that clamps the diamond tool and a moving means that moves the total cutting face of the diamond tool and a portion to be processed of an article to be processed relatively in the direction crossing the cutting face, wherein an angle formed by a first tangential line on an end portion of the first edge portion on the side of the third edge portion and by a third tangential line on an end portion of the third edge portion on the side of the first edge portion is less than 90°. In FIG. 3, angle α formed by first tangential line L1 on an end portion of the first edge portion 13a on the side of the third edge portion 13c and by third tangential line L5 on an end portion of the third edge portion 13c on the side of the first edge portion 13a is less than 90°, and therefore, it is possible to process cylindrical surface 11a and ring-shaped transfer surface 11c tactfully, as explained above concerning the invention of Item 1.

The processing apparatus described in Item 15 is one described in Item 14, wherein the third edge portion is in a form that is asymmetric linearly for a bisector of an angle formed by a first tangential line on an end portion of the first edge portion on the side of the third edge portion and a second tangential line on an end portion of the second edge portion on the side of the third edge portion, and when a perpendicular line is drawn on the aforementioned bisector from an end portion of the third edge portion on the side of the first edge portion, the point of intersection of the perpendicular line and the bisector is positioned outside the cutting face.

The processing apparatus described in Item 16 is one described in either one of Item 1–Item 15, wherein a curved surface (which is not naturally limited to a spherical surface in this case, but includes optional curved surface such as an aspheric surface) of an article to be processed is generated with the third edge portion, and a straight line form connected with the curved surface is generated by transferring a form of the first edge portion. To be more concrete, it is possible to generate a sharp corner, because a form of a cutting edge of the tool can be transferred onto a step portion of the corner portion of the diffractive groove by feeding diamond tool 13 which has been fed to the position shown in FIG. 3 upward (Z-axis plus direction) and toward the left (X-axis minus direction) in the drawing.

The processing apparatus described in Item 17 is one described in Items 6, 7 and either one of Item 12–Item 15, wherein a curved surface of an article to be processed is generated with the third edge portion, and straight line form connected with the curved surface is generated by transferring a form of the first edge portion. To be more concrete, it is possible to generate a sharp corner, because a corner portion of the diffractive groove is processed by the end portion of the first edge portion on the side of the third edge portion by feeding diamond tool 13 which has been fed to the position shown in FIG. 3 only upward (Z-axis plus direction).

The processing apparatus described in Item 18 is one described in either one of Item 1–Item 17, wherein the processing apparatus is used in a forming die for forming optical elements, and the first edge portion of the diamond tool is held to be in parallel with an optical axis of the forming die for optical elements to be processed or to be at an angle within ±10° for the optical axis.

The processing apparatus described in Item 19 is one described in either one of Item 1–Item 18, wherein the second edge portion is shaped in a line.

A processing method described in Item 20 uses a diamond tool provided with a cutting face having, on its cutting edge made of diamond, a linear first edge portion, a second edge portion in an optional form and a quadratic-curve-shaped third edge portion that is formed between an end portion of the first edge portion and an end portion of the second edge portion, and is continued to the end portion of the second edge portion, wherein when the cutting face is projected within the first quadrant on an X-Y plane with the first edge portion representing an X axis and with the peak of the tip of the cutting face representing an intercept (0, y), a shape formed between the end portion of the first edge portion and the end portion of the second edge portion, is asymmetric linearly for a straight line that is in parallel with the X axis passing through the intercept, and a shape of the third edge portion covering from the peak of the tip of the cutting face to the end portion of the second edge portion is in a shape of the quadratic curve wherein Y increases when X increases, and wherein the peak of the tip of the cutting face is positioned at the third edge portion, and moves the total cutting face of the diamond tool and a portion to be processed of an article to be processed relatively in the direction crossing the cutting face. Functional effects of the present invention are the same as those in the invention described in Item 1.

The processing method described in Item 21 is represented by the invention described in Item 20, wherein when the aforementioned cutting face is projected within the first quadrant on an X-Y plane with the first edge portion representing an X axis and with the peak of the tip of the cutting face representing an intercept $(0, y)$ of Y axis, $2y<y_2$ is satisfied when $(x_2, y_2)$ represents coordinates of an end portion of the second edge portion.

The processing method described in Item 22 is represented by the invention described in Item 20 or Item 21, wherein Y in the intercept $(0, y)$ is within a range of 0 μm–0.4 μm as a distance.

The processing method described in Item 23 is represented by the invention described in either one of Items 20–22, wherein there is provided fourth edge portion in an optional form by which an end portion of the third edge portion is continued to the end portion of the first edge portion.

The processing method described in Item 24 is represented by the invention described in Item 23, wherein an end portion of the third edge portion is a peak of a tip of the cutting face.

The processing method described in Item 25 is represented by the invention described in either one of Items 20–22, wherein an end portion of the third edge portion is continued to the end portion of the first edge portion, which represents, for example, an occasion of y=0.

The processing method described in Item 26 is represented by the invention described in Item 25, wherein the peak of the tip of the cutting face agrees in terms of position with the end portion of the first edge portion, which represents, for example, an occasion of y=0.

The processing method described in Item 27 is represented by the invention described in either one of Items 20–26, wherein the third edge portion is convex.

The processing method described in Item 28 is represented by the invention described in either one of Items 20–27, wherein the quadratic curve is in a form of a convex circular arc. In this case, "convex" means, for example, a shape swelling outward from cutting face 113e as shown in FIG. 11.

The processing method described in Item 29 is represented by the invention described in Item 23 or Item 24 wherein the third edge portion and the fourth edge portion are convex.

The processing method described in Item 30 is represented by the invention described in Item 29, wherein each of the third edge portion and the fourth edge portion is in a form of a convex circular arc.

A processing method described in Item 31 is one to process by using a diamond tool wherein there is provided a cutting face having, on its cutting edge made of diamond, a linear first edge portion, a second edge portion extending in the direction crossing the first edge portion and a circular-arc-shaped third edge portion formed between an end portion of the first edge portion and an end portion of the second edge portion, and the third edge portion is in a form that is asymmetric linearly for a bisector of an angle formed by a first tangential line on an end portion of the first edge portion on the side of the third edge portion and a second tangential line on an end portion of the second edge portion on the side of the third edge portion, wherein the total cutting face of the diamond tool and a portion to be processed of an article to be processed are moved relatively in the direction crossing the cutting face. Functional effects of the present invention are the same as those in the invention described in Item 12.

The processing method described in Item 31 is one wherein when a perpendicular line is drawn on the aforementioned bisector from an end portion of the third edge portion on the side of the first edge portion, the point of intersection of the perpendicular line and the bisector is positioned outside the cutting face. Functional effects of the present invention are the same as those in the invention described in Item 13.

The processing method described in Item 33 is one to process by using a diamond tool wherein there is provided a cutting face having, on its cutting edge made of diamond, a linear first edge portion, a second edge portion extending in the direction crossing the first edge portion and a circular-arc-shaped third edge portion formed between an end portion of the first edge portion and an end portion of the second edge portion, and an angle formed by a first tangential line on an end portion of the first edge portion on the side of the third edge portion and a third tangential line on an end portion of the third edge portion on the side of the first edge portion is less than 90°, wherein the total cutting face of the diamond tool and a portion to be processed of an article to be processed are moved relatively in the direction crossing the cutting face. Functional effects of the present invention are the same as those in the invention described in Item 14.

The processing method described in Item 34 is one described in Item 33, wherein the third edge portion is in a form that is asymmetric linearly for a bisector of an angle formed by a first tangential line on an end portion of the first edge portion on the side of the third edge portion and a second tangential line on an end portion of the second edge portion on the side of the third edge portion, and when a perpendicular line is drawn on the aforementioned bisector from an end portion of the third edge portion on the side of the first edge portion, the point of intersection of the perpendicular line and the bisector is positioned outside the cutting face. Functional effects of the present invention are the same as those in the invention described in Item 15.

The processing method described in Item 35 is one described in either one of Items 20–34, wherein wherein a form of a curved surface of an article to be processed is generated with the third edge portion, and a straight line form connected with the curved surface is generated by transferring a form of the first edge portion. Functional effects of the present invention are the same as those in the invention described in Item 16.

The processing method described in Item 36 is one described in Items 25, 26 and either one of Items 31–34, wherein a form of a curved surface of an article to be processed is generated with the third edge portion, and a straight line form connected with the curved surface is generated by using an end portion of the first edge portion on the side of the third edge portion. Functional effects of the present invention are the same as those in the invention described in Item 17.

The processing method described in Item 38 is one described in either one of Items 20–37, wherein the processing apparatus is used in a forming die for forming optical elements, and the first edge portion of the diamond tool is held to be in parallel with an optical axis of the forming die for optical elements to be processed or to be at an angle within ±10° for the optical axis.

The processing method described in Item 38 is one described in either one of Item 20–Item 37, wherein the second edge portion is shaped in a line.

A diamond toll described in Item 39 is one used for either one of the processing apparatuses described in Items 1–19, or for either one of the processing methods described in Items 20–38.

In this case, as "optical elements", there are given, for example, a lens, a prism, a diffraction grating (diffractive lens, diffractive prism, diffractive plate and chromatic aberration correcting element), an optical filter (spatial lowpass filter, wavelength band-pass filter, wavelength lowpass filter, wavelength highpass filter etc.), a polarizing filter (analyzer, azimuth rotator, polarizing and segregating prism) and a phase filter (phase plate, hologram, etc.), to which, however, the invention is not limited.

The invention makes it possible to provide a processing apparatus, a processing method and a diamond tool which are suitable for processing a forming die for optical elements represented by, for example, a diffractive lens and can form a highly accurate processed surface by processing sharply a corner portion of a diffractive groove while keeping surface roughness of a ring-shaped optical transfer surface to be satisfactory.

(Embodiment of the Invention)

Figure 4:
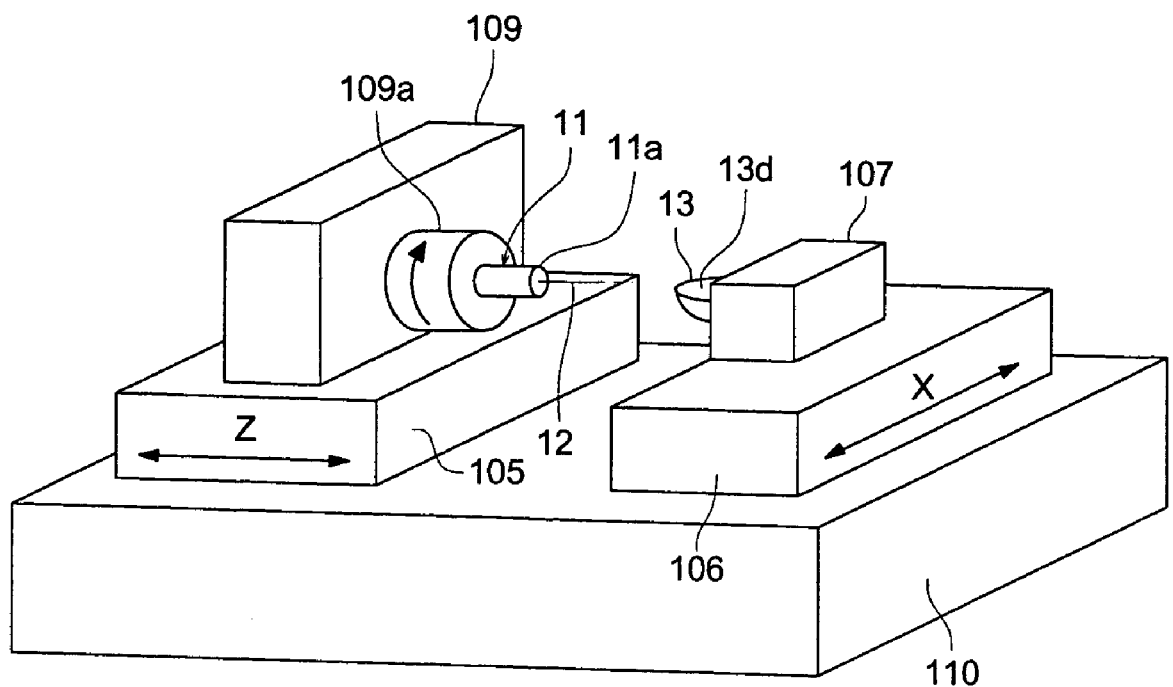
FIG. 4 is a perspective view of a superfine processing machine representing a processing apparatus relating to First Embodiment.

Embodiments of the invention will be explained as follows, referring to the drawings. FIG. 4 is a perspective view of a superfine lathe for X and Z axes representing a processing apparatus relating to First Embodiment. It is assumed that diamond tools in shapes shown in FIGS. 2 and 3 are used in the embodiments described below.

In FIG. 4, rotating mechanism 109 is installed on Z-axis stage 105 which is movable freely in the direction of Z-axis on surface plate 110, and they are mounted in a way that a line of the axis of rotation of rotary chuck 109a of the rotating mechanism 109 agrees with center axis of optical transfer surface 12 of die material 11 to be processed. On the other hand, on X-axis stage 106 which is movable freely in the direction of X-axis on the surface plate 110, there is installed tool-fixing portion 107 representing a clamping member on which diamond tool 13 is clamped so that first edge portion 13a (FIG. 3) may be in parallel with the line of the axis of rotation. The die material 11 is rotated by the rotating mechanism 109, then, X-axis stage 107 and the Z-axis stage 105 are controlled by NC program, and the die material 11 representing an article to be processed and a cutting face of the diamond tool 13 are moved relatively, thus, base optical transfer surface 11a is processed as shown in FIG. 3. In the present embodiment, a moving means is composed of rotating mechanism 109, X-axis stage 107 and Z-axis stage 105.

EXAMPLE 1

An example conducted by the inventors of the invention will be explained as follows. As shown in FIG. 4, a first edge portion (which is not shown because it is microscopic) in a form of a straight line of diamond tool 13 was clamped to be in parallel with a central axis of the base optical transfer surface 11a. Then, the die 11 was rotated at the speed of 1000 rpm, then, the X-axis stage and the Z-axis stage were controlled by NC program, and the tip portion of diamond tool 13 was moved at the speed of 0.2 mm/minute from the outer circumference of die 11 to the central portion to process a desired form of diffraction optical transfer surface. With respect to a chromatic aberration correcting element formed by the aforementioned die, the number of diffractive ring-shaped zones is 98, an effective radius thereof is 2.2 mm and a base form of an optical surface is a plane.

For the die material 11, HPM 50 (Pre-hardened steel) was used as a base material, a shape of aspheric surface was formed roughly for the surface to be cut, and 50 μm-thick electroless deposition was provided as a processed layer. A form requested for base optical transfer surface 11a of die material 11 is one with which diffractive ring-shaped zones to be formed on an optical surface of a chromatic aberration correcting element that corrects chromatic aberration of a plastic objective lens used for an optical pickup device employing a violet laser, can be made.

Figure 5:
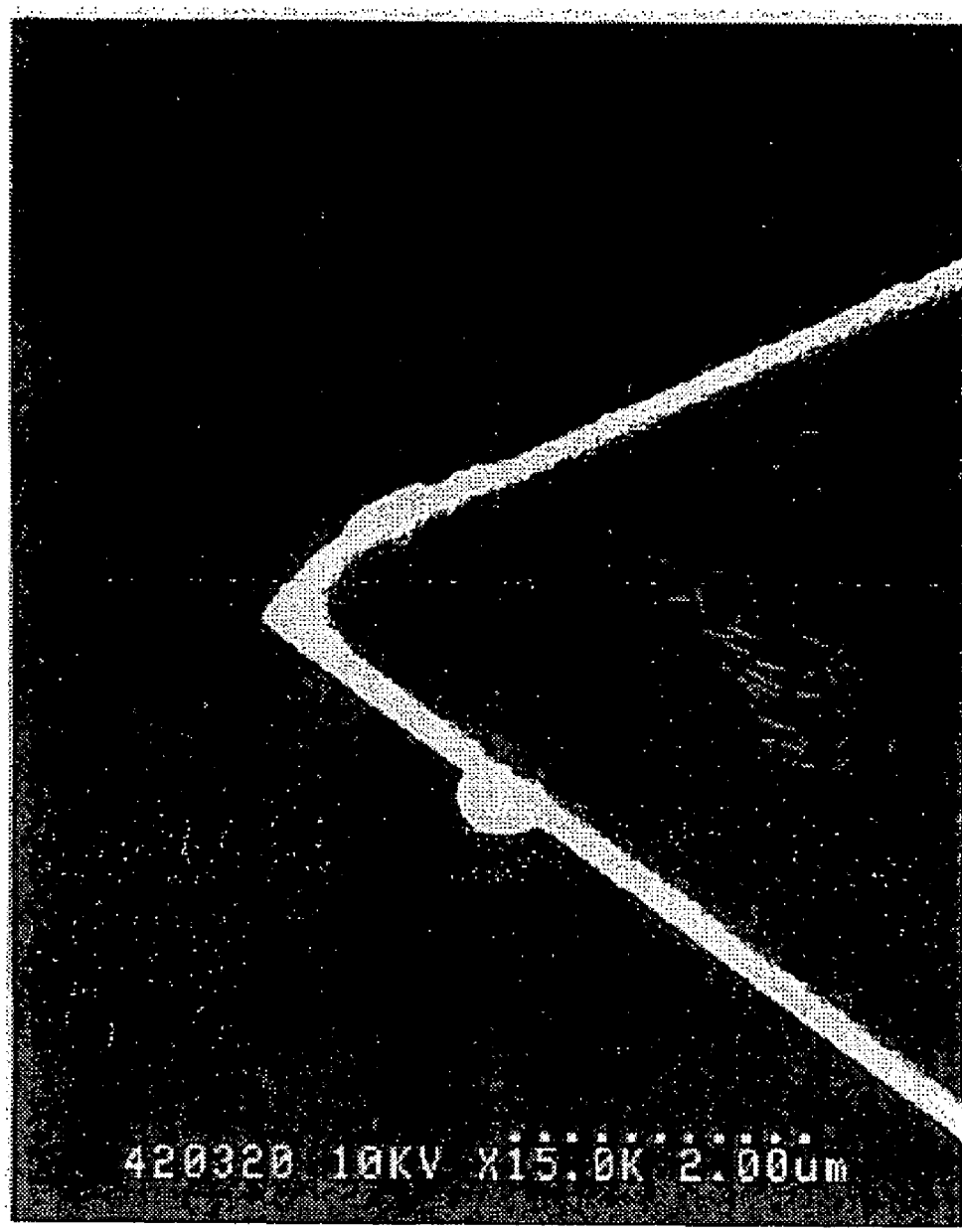
FIG. 5 is a photomicrograph of a diamond tool used in an example.

FIG. 5 is an enlarged diagram of a diamond tool used in the present embodiment, and on the observation image obtained by observing a tip portion of a cutting face of a cutting edge through an electron microscope of a scanning type, a radius of a circular arc connected with a tip of a cutting edge is 1.8 μm and a face angle is 60°. Further, a cutting edge is natural mono-crystal-diamond.

Figure 6A:
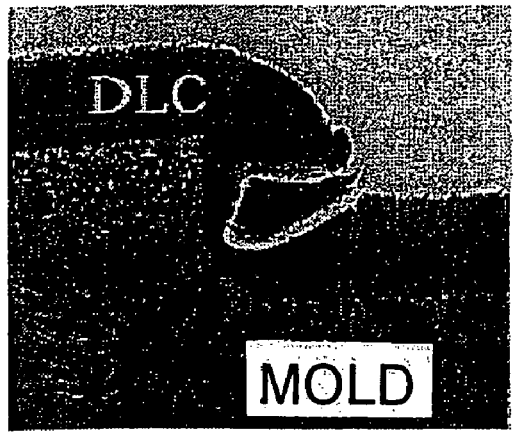
FIG. 6 shows photographs of an electron microscope respectively for a die diffractive groove processed by the use of a conventional R-cutting tool (radius R of the tip on the cutting edge is 1 μm) and a die diffractive groove processed by the use of a diamond tool of the invention.
Figure 6B:
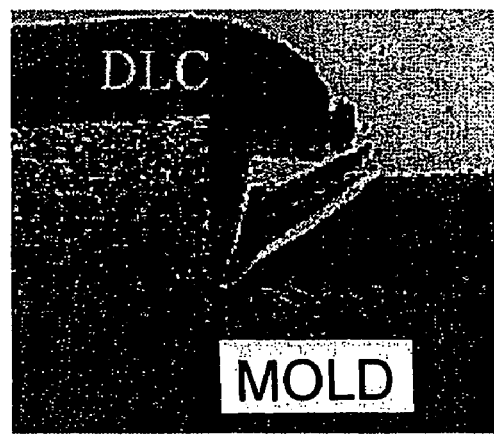

FIG. 6 shows sectional views by an electron microscope of a scanning type respectively for die diffractive grooves processed by the use of a conventional R-cutting tool (tip R of cutting edge is 1 μm) and for die diffractive grooves processed by the use of a diamond tool of the invention. A corner form of a die diffractive groove processed by the use of a conventional R-cutting tool is in a form of a circular arc resulted from the transfer of nose R of a tip of the tool, and a range of difference from a design form in the direction of the optical transfer surface radius is 0.8 μm (FIG. 6(a)). On the other hand, a corner form of a die diffractive groove processed by the use of a diamond tool of the invention is in a form of an edge and a range of difference from a design form in the direction of the optical transfer surface radius is 0.1 μm to be closer to the design form (FIG. 6(b)). With regard to pupil transmission factor of a plastic chromatic aberration correcting element formed by the die processed by the use of a diamond tool of the invention, an improvement of 13% was confirmed when compared with a die processed by the use of a conventional R-cutting tool.

EXAMPLE 2

In processing of a die optical transfer surface by rotating in the same way as in Example 1, a tool wherein a face angle is 30°, a radius of a circular arc connected with a tip of cutting edge is 1 μm and a connection angle between a linear edge line and a circular arc is 60° was used as a working diamond tool, and diffractive grooves were made on an optical transfer surface representing an aspheric surface where an angle formed between itself and an optical axis at the outermost circumference is 35°. A pitch of the diffractive grooves is 10 μm and a step of a diffractive groove is 1.5 μm. As an example, a range of difference from the design form in the direction of optical transfer surface radius for the corner portion of diffractive grooves in the case of processing with conventional R-cutting tool wherein a circular arc radius of the cutting edge on a tip of the tool was 1 μm, was 1.6 μm, but in the case of the tool of the invention, the range was as small as 0.1 μm in the processing.

Incidentally, in the examples stated above, cutting processing is conducted by feeding the diamond tool from the outer circumference to the optical axis side after the base optical transfer surface is processed roughly. However, it is also possible to feed the diamond tool from the optical axis side to the outer circumference side, without being limited to the foregoing. It is further possible to conduct cutting processing directly with the diamond tool, or to repeat cutting with the diamond tool, without sticking to the material form before cutting with the diamond tool, for example, without forming the base optical transfer surface in advance.

EXAMPLE 3

Figure 7:
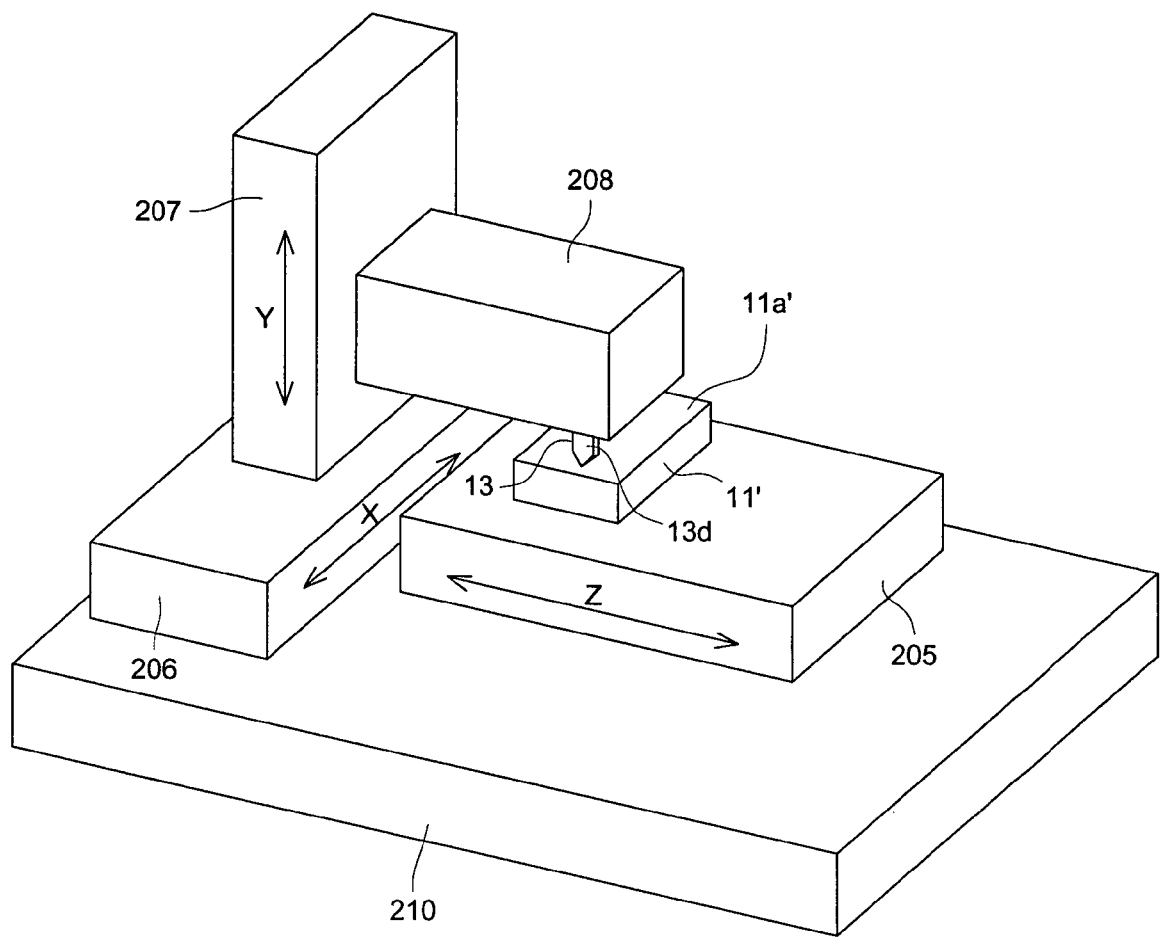
FIG. 7 is a perspective view of a superfine processing machine representing a processing apparatus relating to Second Embodiment.

FIG. 7 is a perspective view of an X-Y-Z axes superfine processing machine representing a processing apparatus relating to Second Embodiment. In FIG. 7, die material 11' to be cut is fixed on Z-axis stage 205 that can move freely in the Z-axis direction on surface plate 210. On X-axis stage 206 that can move freely in the X-axis direction on surface plate 210, on the other hand, there is attached Y-axis stage 207 that can move freely in the Y-axis direction, and tool-clamping portion 208 which represents a clamping member and clamps diamond tool 13 is installed on the Y-axis stage 207. Under this condition, when die material 11' and a cutting face of diamond tool 13 are moved relatively by controlling X-axis stage 206, Z-axis stage 205 and Y-axis stage 207, it is possible to process die optical transfer surface 11'. In the present embodiment, the moving means is composed of X-axis stage 206, Y-axis stage 207 and Z-axis stage 205.

In this case, there was used a diamond tool having a face angle of 60° and a circular arc radius connected with a tip of the cutting edge of 1.8 μm, and a diffractive groove that is in a form of a straight line in the X-axis direction was formed on optical transfer surface 11a' in a shape of a flat plate through cutting processing, by moving the diamond tool 13 in the direction of a perpendicular line on cutting face 13d for die material 11'. In the same way as in the example shown in FIG. 6, with respect to a form of a die diffractive groove corner, a range of difference from a design form in the direction of the optical transfer surface radius was 0.8 μm for those processed by using a conventional R-cutting tool, and a range of difference from a design form was 0.1 μm in the case of the tool of the invention, which means that a form that is more close to the design form was obtained through processing.

EXAMPLE 4

Figure 8:
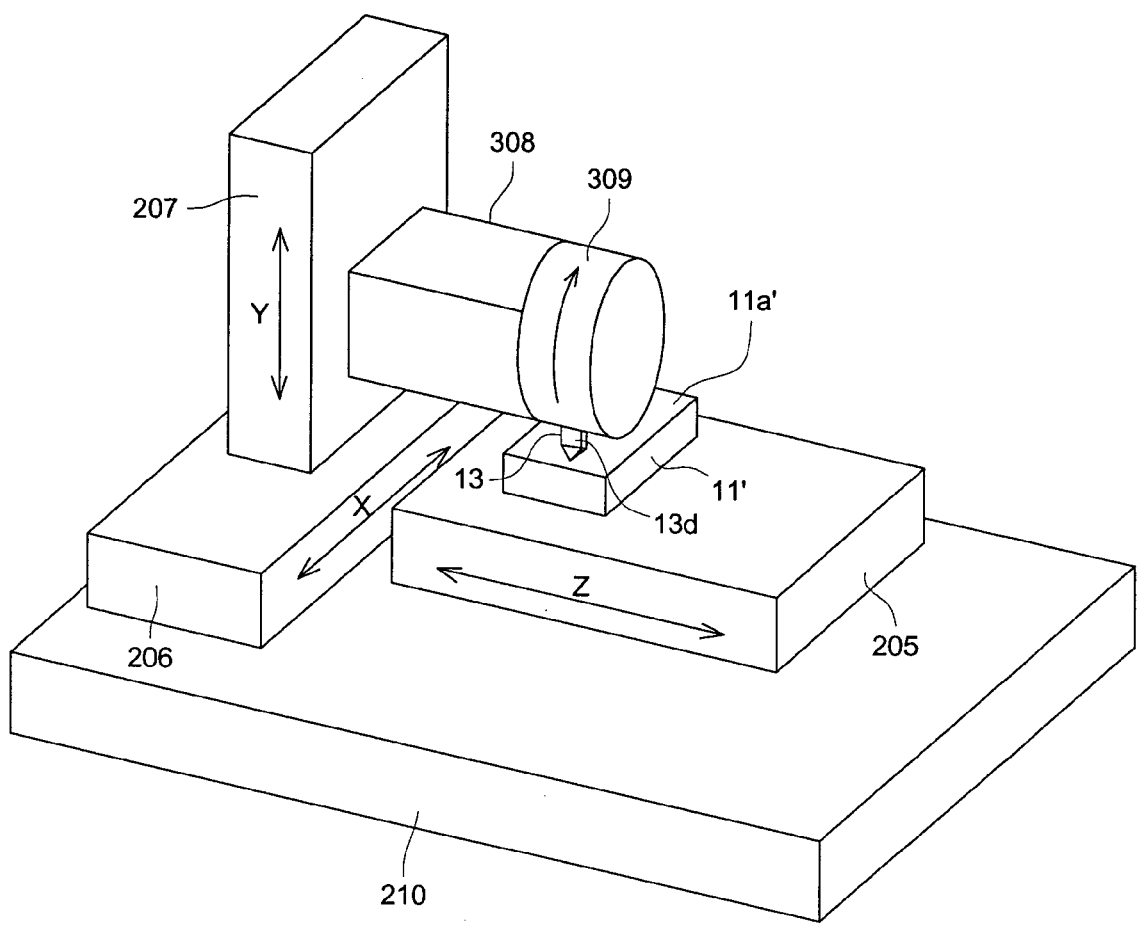
FIG. 8 is a perspective view of a superfine processing machine representing a processing apparatus relating to Third Embodiment.

FIG. 8 is a perspective view of an X-Y-Z axes superfine processing machine representing a processing apparatus relating to Third Embodiment. In FIG. 8, rotating mechanism 309 that rotates in the direction that is in parallel with a mounting surface of Y-axis stage is provided on the Y-axis stage, and diamond tool 13 is fixed on the outer circumferential surface of the rotating mechanism. The rotating mechanism 309 constitutes a clamping member. Other structures are the same as those in the embodiment shown in FIG. 7, and they are given the same symbols, and explanation for them will be omitted here. Incidentally, in the present embodiment, rotating mechanism 309, X-axis stage 206, Y-axis stage 207 and Z-axis stage 205 constitute the moving means.

In this case, there was used a diamond tool having a face angle of 60° and a circular arc radius connected with a tip of the cutting edge of 1.8 μm, and a diffractive groove that is in a form of a straight line in the X-axis direction was formed on optical transfer surface 11a' in a shape of a flat plate by bringing diamond tool 13 close to die material 11' and by moving the diamond tool 13 in the direction of a perpendicular line on cutting face 13d. In the same way as in the example shown in FIG. 6, with respect to a form of a die diffractive groove corner, a range of difference from a design form in the direction of the optical transfer surface radius was 0.8 μm for those processed by using a conventional R-cutting tool, and a range of difference from a design form was 0.1 μm in the case of the tool of the invention, which means that a form that is more close to the design form was obtained through processing.

Though the invention has been explained above, referring to embodiments, the invention should not be construed to be limited to the embodiments, and modifications and improvements may naturally be made properly. For example, the processing apparatus and the processing method of the invention can also be used for processing other than that for a forming die for optical elements. Further, even in the case of generating a forming die that molds optical elements by using the invention, optical transfer surfaces in a target include all of the optical transfer surfaces each having a form of discontinuous fine surface having thereon two tangential lines in addition to a step and a groove, which means that the invention is not limited to the diffractive optical transfer surface.

What is claimed is:

1. A processing apparatus, comprising:
a diamond tool having a cutting edge made of a diamond and a rake face including a first edge portion shaped in a straight line, a second edge portion shaped in an arbitrary shape and a third edge portion formed between an end portion of the first edge portion and an end portion of the second edge portion and having a first end portion and a second end portion, wherein a tip end peak point of the rake face is located on the third edge portion;
a holding member to hold the diamond tool;
a shifting device to shift relatively at least one of the rake face of the diamond tool and a portion of an article to be processed in a direction in which the rake face and a portion of the article cross with each other;
wherein the first end portion of the third edge portion continues to the end portion of the second edge portion, and
wherein when the first edge portion is made as X axis, the tip end peak point of the rake face is made as an intercept (0, y) on Y axis, and the rake face is projected in the first quadrant on an X-Y plane, the shape between the end portion of the first edge portion and the end portion of the second edge portion is asymmetric around a straight line which passes at the intercept and is parallel to X axis and the shape is shaped to be not a straight line such that Y value of a point on the shape increases as X value of the point increases.

2. The processing apparatus of claim 1, wherein a shape of the third edge portion from the tip end peak point of the rake face to the end portion of the second edge portion is a quadratic curve on which Y increases when X increases.

3. The processing apparatus of claim 2, wherein the shape of the third edge portion from the tip end peak point of the rake face to the end portion of the second edge portion is a circular arc on which Y increases when X increases.

4. The processing apparatus of claim 1, wherein when the first edge portion is made as X axis, the tip end peak point of the rake face is made as an intercept (0, y) on Y axis, and the rake face is projected in the first quadrant on an X-Y plane, the following formula is satisfied when the coordinate of the end portion of the second edge portion is $(X_2, Y_2)$:

$$2y < y_2.$$

5. The processing apparatus of claim 1, wherein y of the intercept (0, y) is 0 to 0.4 μm in length.

6. The processing apparatus of claim 1, wherein the rake face further includes a fourth edge portion shaped in an arbitrary form and connecting the end portion of the first edge portion and the second end portion of the third edge portion.

7. The processing apparatus of claim 6, wherein the second end portion of the third edge portion is the tip end peak point of the rake face.

8. The processing apparatus of claim 1, wherein the second end portion of the third edge portion continues to the end portion of the first edge portion.

9. The processing apparatus of claim 8, wherein the tip end peak point coincides with the end portion of the first edge portion.

10. The processing apparatus of claim 1, wherein the third edge portion is shaped in a convex.

11. The processing apparatus of claim 10, wherein the third edge portion is shaped in a convex circular arc.

12. The processing apparatus of claim 6, wherein the third edge portion and the fourth edge portion are shaped in a convex.

13. The processing apparatus of claim 6, wherein the third edge portion and the fourth edge portion are shaped in a convex circular arc.

14. A processing apparatus, comprising:
a diamond tool having a cutting edge made of a diamond and a rake face including a first edge portion shaped in a straight line, a second edge portion located to extend in a direction crossing the first edge portion and a third edge portion formed between an end portion of the first edge portion and an end portion of the second edge portion and shaped in a circular arc;
a holding member to hold the diamond tool;
a shifting device to shift relatively at least one of the rake face of the diamond tool and a portion of an article to be processed in a direction in which the rake face and a portion of the article cross with each other;
wherein the third edge portion is asymmetric for a bisector of an angle formed between a first tangential line at a third edge portion-side end portion of the first edge portion and a second tangential line at a third edge portion-side end portion of the second edge portion.

15. The processing apparatus of claim 14, wherein when a perpendicular line to the bisector is drawn from a first edge portion-side end portion of the third edge portion, the cross point between the perpendicular line and the bisector is located at an outside of the rake face.

16. A processing apparatus, comprising:
a diamond tool having a cutting edge made of a diamond and a rake face including a first edge portion shaped in a straight line, a second edge portion located to extend in a direction crossing the first edge portion; a holding member to hold the diamond tool and a third edge portion formed between an end portion of the first edge portion and an end portion of the second edge portion and shaped in a circular arc;
a shifting device to shift relatively at least one of the rake face of the diamond tool and a portion of an article to be processed in a direction in which the rake face and a portion of the article cross with each other; wherein an angle formed between a first tangential line at a third edge portion-side end portion of the first edge portion and a third tangential line at a first edge portion-side end portion of the third edge portion is less than 90 degrees.

17. The processing apparatus of claim 16, wherein the third edge portion is asymmetric for a bisector of an angle formed between a first tangential line at a third edge portion-side end portion of the first edge portion and a second tangential line at a third edge portion-side end portion of the second edge portion and wherein when a perpendicular line to the bisector is drawn from a first edge portion-side end portion of the third edge portion, the cross point between the perpendicular line and the bisector is located at an outside of the rake face.

18. The processing apparatus of claim 1, wherein the diamond tool creates a curved shape on the processed article with the third edge portion and transfers the shape of the first edge portion onto the processed articles as a straight line shape continued to the curved shape.

19. The processing apparatus of claim 8, wherein the diamond tool creates a curved shape on the processed article with the third edge portion and creates a straight line shape continued to the curved shape on the processed article with the third edge portion-side end portion of the first edge portion.

20. The processing apparatus of claim 1, wherein the diamond tool is used for producing a die to form an optical element in such a way that the holding member holds the first edge portion of the diamond tool with an angle parallel to or within a range of ±10° for the optical axis of the optical element to be produced.

21. The processing apparatus of claim 1, wherein the second edge portion is shaped in a straight line.

22. A processing method, comprising steps of:
using a diamond tool having a cutting edge made of a diamond and a rake face including a first edge portion shaped in a straight line, a second edge portion shaped in an arbitrary shape and a third edge portion formed between an end portion of the first edge portion and an end portion of the second edge portion and having a first end portion and a second end portion, wherein the first end portion of the third edge portion continues to the end portion of the second edge portion, wherein when the first edge portion is made as X axis, the tip end peak point of the rake face is made as an intercept $(0, y)$ on Y axis, and the rake face is projected in the first quadrant on an X-Y plane, the shape between the end portion of the first edge portion and the end portion of the second edge portion is asymmetric around a straight line which passes at the intercept and is parallel to X axis and the shape is shaped to be not a straight line such that Y value of a point on the shape increases as X value of the point increases, and wherein a tip end peak point of the rake face is located on the third edge portion; and
shifting relatively at least one of the rake face of the diamond tool and a portion of an article to be processed in a direction in which the rake face and a portion of the article cross with each other.

23. The processing method of claim 22, wherein a shape of the third edge portion from the tip end peak point of the rake face to the end portion of the second edge portion is a quadratic curve on which Y increases when X increases.

24. The processing method of claim 23, wherein the shape of the third edge portion from the tip end peak point of the rake face to the end portion of the second edge portion is a circular arc on which Y increases when X increases.

25. The processing method of claim 22, wherein when the first edge portion is made as X axis, the tip end peak point of the rake face is made as an intercept $(0, y)$ on Y axis, and the rake face is projected in the first quadrant on an X-Y plane, the following formula is satisfied when the coordinate of the end portion of the second edge portion is $(X_2, Y_2)$:

$$2y < y_2.$$

26. The processing method of claim 22, wherein y of the intercept (0, y) is 0 to 0.4 µm in length.

27. The processing method of claim 22, wherein the rake face further includes a fourth edge portion shaped in an arbitrary form and connecting the end portion of the first edge portion and the second end portion of the third edge portion.

28. The processing method of claim 27, wherein the second end portion of the third edge portion is the tip end peak point of the rake face.

29. The processing method of claim 22, wherein the second end portion of the third edge portion continues to the end portion of the first edge portion.

30. The processing method of claim 29, wherein the tip end peak point coincides with the end portion of the first edge portion.

31. The processing method of claim 22, wherein the third edge portion is shaped in a convex.

32. The processing method of claim 31, wherein the third edge portion is shaped in a convex circular arc.

33. The processing method of claim 27, wherein the third edge portion and the fourth edge portion are shaped in a convex.

34. The processing method of claim 33, wherein the third edge portion and the fourth edge portion are shaped in a convex circular arc.

35. A processing method, comprising steps of:
using a diamond tool having a cutting edge made of a diamond and a rake face including a first edge portion shaped in a straight line, a second edge portion located to extend in a direction crossing the first edge portion, wherein the third edge portion is asymmetric for a bisector of an angle formed between a first tangential line at a third edge portion-side end portion of the first edge portion and a second tangential line at a third edge portion-side end portion of the second edge portion; and
shifting relatively at least one of the rake face of the diamond tool and a portion of an article to be processed in a direction in which the rake face and a portion of the article cross with each other.

36. The processing method of claim 35, wherein when a perpendicular line to the bisector is drawn from a first edge portion-side end portion of the third edge portion, the cross point between the perpendicular line and the bisector is located at an outside of the rake face.

37. A processing method, comprising steps of:
using a diamond tool having a cutting edge made of a diamond and a rake face including a first edge portion shaped in a straight line, a second edge portion located to extend in a direction crossing the first edge portion, wherein an angle formed between a first tangential line at a third edge portion-side end portion of the first edge portion and a third tangential line at a first edge portion-side end portion of the third edge portion is less than 90 degrees; and
shifting relatively at least one of the rake face of the diamond tool and a portion of an article to be processed in a direction in which the rake face and a portion of the article cross with each other.

38. The processing method of claim 37, wherein the third edge portion is asymmetric for a bisector of an angle formed between a first tangential line at a third edge portion-side end portion of the first edge portion and a second tangential line at a third edge portion-side end portion of the second edge portion and wherein when a perpendicular line to the bisector is drawn from a first edge portion-side end portion of the third edge portion, the cross point between the perpendicular line and the bisector is located at an outside of the rake face.

39. The processing method of claim 22, wherein the diamond tool creates a curved shape on the processed article with the third edge portion and transfers the shape of the first edge portion onto the processed articles as a straight line shape continued to the curved shape.

40. The processing method of claim 30, wherein the diamond tool creates a curved shape on the processed article with the third edge portion and creates a straight line shape continued to the curved shape on the processed article with the third edge portion-side end portion of the first edge portion.

41. The processing method of claim 22, wherein the diamond tool is used for producing a die to form an optical element in such a way that the holding member holds the first edge portion of the diamond tool with an angle parallel to or within a range of ±10° for the optical axis of the optical element to be produced.

42. The processing method of claim 22, wherein the second edge portion is shaped in a straight line.

43. A diamond tool, comprising
a cutting edge made of a diamond, and
a rake face including a first edge portion shaped in a straight line, a second edge portion shaped in an arbitrary shape and a third edge portion formed between an end portion of the first edge portion and an end portion of the second edge portion and having a first end portion and a second end portion,
wherein a tip end peak point of the rake face is located on the third edge portion;
wherein the first end portion of the third edge portion continues to the end portion of the second edge portion, and
wherein when the first edge portion is made as X axis, the tip end peak point of the rake face is made as an intercept (0, y) on Y axis, and the rake face is projected in the first quadrant on an X-Y plane, the shape between the end portion of the first edge portion and the end portion of the second edge portion is asymmetric around a straight line which passes at the intercept and is parallel to X axis and the shape is shaped to be not a straight line such that Y value of a point on the shape increases as X value of the point increases.

44. A diamond tool, comprising:
a cutting edge made of a diamond; and
a rake face including a first edge portion shaped in a straight line, a second edge portion located to extend in a direction crossing the first edge portion and a third edge portion formed between an end portion of the first edge portion and an end portion of the second edge portion and shaped in a circular arc;
wherein the third edge portion is asymmetric for a bisector of an angle formed between a first tangential line at a third edge portion-side end portion of the first edge portion and a second tangential line at a third edge portion-side end portion of the second edge portion.

45. A diamond tool, comprising:
a cutting edge made of a diamond; and
a rake face including a first edge portion shaped in a straight line, a second edge portion located to extend in a direction crossing the first edge portion and a third edge portion formed between an end portion of the first edge portion and an end portion of the second edge portion and shaped in a circular arc;
wherein an angle formed between a first tangential line at a third edge portion-side end portion of the first edge portion and a third tangential line at a first edge portion-side end portion of the third edge portion is less than 90 degrees.

* * * * *